United States Patent
Lee et al.

(10) Patent No.: US 9,220,059 B2
(45) Date of Patent: Dec. 22, 2015

(54) ELECTRONIC SHELF LABEL SYSTEM AND METHOD OF OPERATING THE SAME

(71) Applicant: SAMSUNG ELECTRO-MECHANICS CO., LTD., Suwon (KR)

(72) Inventors: Chung Hee Lee, Suwon (KR); Dae Gil Yoon, Suwon (KR)

(73) Assignee: Samsung Electro-Mechanics Co., Ltd., Suwon-si (KR)

( * ) Notice: Subject to any disclaimer, the term of this patent is extended or adjusted under 35 U.S.C. 154(b) by 271 days.

(21) Appl. No.: 13/835,438

(22) Filed: Mar. 15, 2013

(65) Prior Publication Data

US 2014/0177604 A1  Jun. 26, 2014

(30) Foreign Application Priority Data

Dec. 21, 2012 (KR) .................... 10-2012-0150861

(51) Int. Cl.
*H04W 52/02* (2009.01)
(52) U.S. Cl.
CPC .................................... *H04W 52/02* (2013.01)
(58) Field of Classification Search
None
See application file for complete search history.

(56) References Cited

U.S. PATENT DOCUMENTS

| | | | |
|---|---|---|---|
| 5,590,129 A | 12/1996 | Ardon | |
| 2006/0214767 A1* | 9/2006 | Carrieri | 340/5.61 |
| 2007/0131764 A1* | 6/2007 | Wallace | 235/383 |
| 2007/0181678 A1* | 8/2007 | Nilsson et al. | 235/383 |
| 2012/0008626 A1* | 1/2012 | Brederveld et al. | 370/392 |
| 2012/0161932 A1* | 6/2012 | Byun et al. | 340/10.1 |
| 2012/0163393 A1* | 6/2012 | Dangy-Caye | 370/401 |
| 2014/0111313 A1* | 4/2014 | Wild et al. | 340/10.42 |
| 2014/0177604 A1* | 6/2014 | Lee et al. | 370/336 |

FOREIGN PATENT DOCUMENTS

| | | |
|---|---|---|
| JP | 8-331676 | 12/1996 |
| JP | 2010-193436 | 9/2010 |
| JP | 2011-24013 | 2/2011 |
| KR | 10-2010-0041969 | 4/2010 |

OTHER PUBLICATIONS

Japanese Office Action issued Apr. 1, 2014 in corresponding Japanese Patent Application No. 2013-115548.

* cited by examiner

*Primary Examiner* — Benjamin H Elliott, IV
(74) *Attorney, Agent, or Firm* — NSIP Law

(57) ABSTRACT

There is provided a method of operating an electronic shelf label system performed by a gateway wirelessly connected to a plurality of electronic shelf label tags and providing data provided from an electronic shelf label server to the plurality of electronic shelf label tags through a data channel, the method including, interlocking with the electronic shelf label server to thereby be allocated time slots of a wakeup channel, providing information regarding the time slots allocated to the gateway to the plurality of electronic shelf label tags, and receiving an update data request from at least one of the plurality of electronic shelf label tags when the time slots allocated to the gateway have elapsed and providing update data in response to the corresponding update data request.

20 Claims, 9 Drawing Sheets

ELECTRONIC SHELF LABEL SYSTEM AND METHOD OF OPERATING THE SAME

CROSS-REFERENCE TO RELATED APPLICATIONS

This application claims the priority of Korean Patent Application No. 10-2012-0150861 filed on Dec. 21, 2012, in the Korean Intellectual Property Office, the disclosure of which is incorporated herein by reference.

BACKGROUND OF THE INVENTION

1. Field of the Invention

The present invention relates to an electronic shelf label system and a method of operating the same.

2. Description of the Related Art

In accordance with the development of tag technology and local area wireless communications, various systems based on tags have been provided. As one system based on tags, there is provided an electronic shelf label system, which has been variously used in environments such as hypermarkets, or the like, providing various products at any time.

The electronic shelf label system may be provided by building a wireless personal area network based on local area wireless technology such as Zigbee, or the like. Such a wireless personal area network needs to be operated in a limited frequency band since it is difficult to use a frequency band that has been already allocated. Therefore, the electronic shelf label system using the wireless personal area network also has a limitation due to the limited frequency band available for the use thereof.

For example, the electronic shelf label system may include a gateway wirelessly providing data from a server and an update tag displaying product information, or the like, based on the data provided by the gateway, wherein the gateway and the update tag have a wakeup channel and a data channel in common.

In addition, the electronic shelf label system uses a plurality of gateways in order to cover a wide area. In the case of the data channel, the plurality of gateways may share and use a single frequency band in common; however, in the case of the wakeup channel, the plurality of gateways may not share and use a single frequency band in common. That is, in the case in which the plurality of gateways and a plurality of update tags associated with the plurality of gateways use a single wakeup channel, there is a limitation in that it is highly likely that a collision in data transmission may occur.

In order to overcome this limitation, the wakeup channel has recently been formed by allocating a frequency to each of the plurality of gateways. However, in this case, there remains a problem in terms of a limitation in the number of frequencies that may be allocated within a predetermined area, the possibility of interference between adjacent frequencies, and the like.

The following Related Art Documents, which relate to the above-mentioned related art, do not disclose a solution to the limitation of the frequency band described above.

RELATED ART DOCUMENT (Patent Document 1) Korean Patent No. 10-1001913
(Patent Document 2) Japanese Patent Laid-Open Publication No. 2011-024013

SUMMARY OF THE INVENTION

An aspect of the present invention provides an electronic shelf label system allowing a plurality of gateways to share a wakeup channel in a time division scheme and allowing the respective update tags to request update data within a period of time allocated to the gateways managing the respective update tags, and a method of operating the same.

According to an aspect of the present invention, there is provided a method of operating an electronic shelf label system performed by a gateway wirelessly connected to a plurality of electronic shelf label tags and providing data provided from an electronic shelf label server to the plurality of electronic shelf label tags through a data channel, the method including: interlocking with the electronic shelf label server to thereby be allocated time slots of a wakeup channel; providing information regarding the time slots allocated to the gateway to the plurality of electronic shelf label tags; and receiving an update data request from at least one of the plurality of electronic shelf label tags when the time slots allocated to the gateway have elapsed and providing update data in response to the corresponding update data request.

The time slots may be provided in an amount corresponding to that of a plurality of gateways sharing the wakeup channel and may be divided into a plurality of time slices, respectively.

The providing of the information regarding the time slots may include periodically broadcasting a wakeup message through the wakeup channel using a frequency band different from that of the data channel, and the wakeup message may include the information regarding the time slots allocated to the gateway and information regarding the time slices.

The providing of the data update may include receiving the data update from the electronic shelf label server; identifying a first electronic shelf label tag transmitting the data update request; and selecting the data update associated with the identified first electronic shelf label tag and providing the selected data update to the first electronic shelf label tag.

The method may further include receiving a registration request message broadcast from a first electronic shelf label tag among the plurality of electronic shelf label tags; transmitting a response to the registration request message to the first electronic shelf label tag; determining whether the first electronic shelf label tag has been registered in the electronic shelf label server when a registration message is received according to the response from the first electronic shelf label tag; and setting the first electronic shelf label tag as a management tag of the gateway and transmitting a response to the registration message to the first electronic shelf label tag, when the first electronic shelf label tag has been registered in the electronic shelf label server.

The information regarding the time slots may include a maximum dispersion time for a reference time slice included in the plurality of time slices, and the plurality of electronic shelf label tags may transmit the update data request in further consideration of the maximum dispersion time in a reference time slice belonging in the following time slot.

According to another aspect of the present invention, there is provided a method of operating an electronic shelf label system performed by electronic shelf label tags matched with a gateway in a relationship of 1:N and updating update data from the gateway through wireless communications, the method including: receiving information regarding time slots allocated to the gateway from the gateway; calculating a remaining sleep time until the next wakeup time using the information regarding the time slots when a wakeup message is received from the gateway; and setting the electronic shelf label tags to be in a wakeup state when the sleep time has elapsed and transmitting an update data request to the gateway.

The electronic shelf label tags may receive the wakeup message through a wakeup channel and transmit the update data request through a data channel using a frequency different from that of the wakeup channel.

The time slots may be provided in an amount corresponding to that of a plurality of gateways sharing the wakeup channel and may be divided into a plurality of time slices, respectively.

The calculating of the remaining sleep time may include: calculating a first time from a current time slice to a final time slice; calculating a second time from a current time slot to the following time slot of the gateway; calculating a third time from a first time slice to a reference time slice; and setting the remaining sleep time by summing up the first to third times.

The calculating of the remaining sleep time may include: receiving a maximum dispersion time from the gateway; generating a random number to calculate a random dispersion time belonging in the maximum dispersion time; and adding the random dispersion time to the reference time slice of the following time slot of the gateway to set the remaining sleep time.

The method may further include: broadcasting a registration request message to a plurality of gateways; receiving a response to the registration request message from at least a portion of the plurality of gateways and selecting a gateway having the best communications connection from among the plurality of gateways; and transmitting a registration message to the selected gateway.

According to another aspect of the present invention, there is provided an electronic shelf label system including: an electronic shelf label server; a plurality of gateways; and a plurality of electronic shelf label tags associated with each of the plurality of gateways, wherein the electronic shelf label server allocates time slots of a wakeup channel to each of the plurality of gateways and provides update data to the plurality of gateways, the plurality of gateways provide information regarding the time slots allocated thereto to the plurality of electronic shelf label tags associated therewith and provide the update data to at least a portion of the plurality of electronic shelf label tags, and the plurality of electronic shelf label tags calculate their sleep times using the information regarding the time slots, and are set to be in a wakeup state and transmit an update data request to the gateways associated therewith when the sleep times end.

The plurality of gateways may a wakeup frame using a single wakeup channel, and the single wakeup channel may be divided into a plurality of time slots in a time division scheme to thereby be used independently by the plurality of gateways.

Each of the time slots may be divided into a plurality of time slices, and the electronic shelf label tags may calculate their sleep times using the time slots allocated to the gateways associated therewith and the time slices.

The electronic shelf label tags may calculate the sleep times using at least one of a first time from a current time slice to a final time slice, a second time from a current time slot to the following time slot of the gateways, a third time from a first time slice to a reference time slice, and a random dispersion time belonging in a maximum dispersion time.

BRIEF DESCRIPTION OF THE DRAWINGS

The above and other aspects, features and other advantages of the present invention will be more clearly understood from the following detailed description taken in conjunction with the accompanying drawings, in which.

DETAILED DESCRIPTION OF THE EMBODIMENTS

Figure 1:
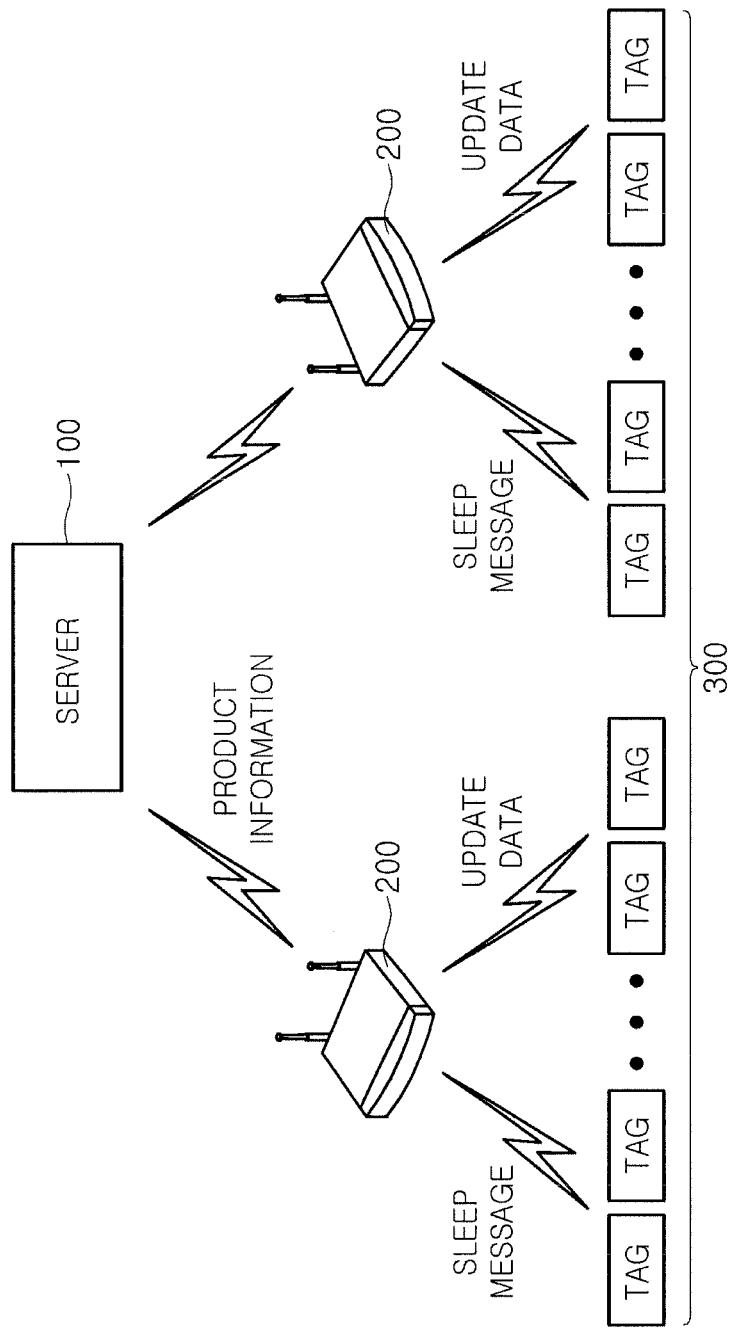
FIG. 1 is a configuration diagram for explaining an electronic shelf label system according to an embodiment of the present invention.

Hereinafter, embodiments of the present invention will be described in detail with reference to the accompanying drawings. The invention may, however, be embodied in many different forms and should not be construed as being limited to the embodiments set forth herein. Rather, these embodiments are provided so that this disclosure will be thorough and complete, and will fully convey the scope of the invention to those skilled in the art. In the drawings, the shapes and dimensions of elements may be exaggerated for clarity, and the same reference numerals will be used throughout to designate the same or like elements.

FIG. 1 is a configuration diagram for explaining an example of an electronic shelf label system according to an embodiment of the present invention.

Referring to FIG. 1, the electronic shelf label system according to the embodiment of the present invention may include an electronic shelf label server 100, a plurality of gateways 200, and a plurality of electronic shelf label tags 300. In the embodiment of the present invention, the plurality of gateways 200 and the plurality of electronic shelf label tags 300 may be wirelessly connected to each other using a wakeup channel and a data channel. Here, the wakeup channel and the data channel may be formed in different frequency bands. That is, according to the related art, the plurality of gateways 200 respectively include a plurality of wakeup channels allocated thereto and a single data channel; however, according to the embodiment of the present invention, the plurality of gateways 200 and the plurality of electronic shelf label tags 300 may share a single wakeup channel and a single data channel.

The electronic shelf label server 100 may generally manage the electronic shelf label system.

The electronic shelf label sever 100 may provide product information to the electronic shelf label tags 300 using the plurality of gateways 200. The electronic shelf label server 100 and the plurality of gateways 200 may be connected to each other in a wired or wireless scheme.

The electronic shelf label server 100 may allocate a time slot of the wakeup channel to at least one gateway 200 and provide update data to the at least one gateway 200.

The gateway 200 may transmit predetermined data to the plurality of electronic shelf label tags 300 managed by the gateway 200. For example, the gateway 200 may provide a wakeup message or the update data to the electronic shelf label tags 300. The electronic shelf label tags 300 may receive the predetermined data from the gateway 200. The electronic shelf label tags 300 may display the received data. For example, the electronic shelf label tags 300 may display information (detailed product information, price information, or the like) on a specific product.

The electronic shelf label server 100, the plurality of gateways 200, and the plurality of electronic shelf label tags 300 that configure the above-mentioned electronic shelf label system will be described in more detail below with reference to FIGS. 2 to 9.

Figure 2:
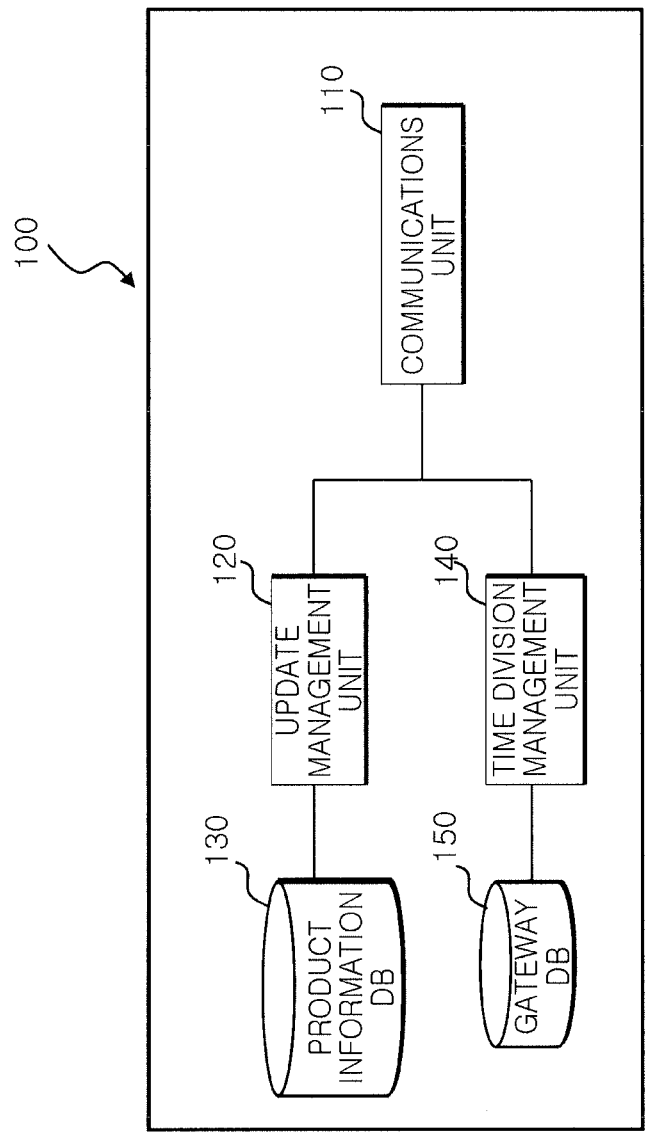
FIG. 2 is a configuration diagram for explaining an electronic shelf label server according to the embodiment of the present invention.

FIG. 2 is a configuration diagram for explaining an electronic shelf label server according to the embodiment of the present invention.

Referring to FIG. 2, the electronic shelf label server 100 may include a communications unit 110, an update management unit 120, a database 130, and a time division management unit 140.

The communications unit 110 may set communications connection with the gateways 200.

The update management unit 120 may provide the update data to the gateway 200. For example, in the case in which update data to be provided to the electronic shelf label tags 300 are present, the electronic shelf label server 100 may provide the corresponding update data to the gateways 200 that may directly communicate with the electronic shelf label tags 300.

To this end, the electronic shelf label server 100 may include the database 130 including a gateway database 132, storing information regarding the gateways and nodes associated with the gateways, and a product information database 131 storing update data.

In the embodiment of the present invention, the update management unit 120 may receive product information provided from the outside to update the product information database 131.

In the embodiment of the present invention, the update management unit 120 may request that the gateways 200 transmit a wakeup message to thereby allow the gateways 200 to transmit the wakeup message to the electronic shelf label tags 300. In this embodiment, since the transmission of the wakeup message is managed by the electronic shelf label server 100, a collision between the gateways 200 due to the transmission of the wakeup message may be prevented.

The time division management unit 140 may manage sharing of the wakeup channel with respect to the plurality of gateways 200. More specifically, the time division management unit 140 may divide a single wakeup channel in a time division scheme and allocate the divided wakeup channels to the plurality of respective gateways 200. Hereinafter, a time unit of the divided wakeup channel allocated to each of the plurality of gateways 200 refers to a time slot. In addition, as described in detail below, a single time slot may be divided into a plurality of time units, known as time slices.

In the embodiment of the present invention, the time division management unit 140 may register the gateways 200 when time slot allocation requests are received from the corresponding gateways 200 and allocate the time slots to all registered gateways.

Figure 3:
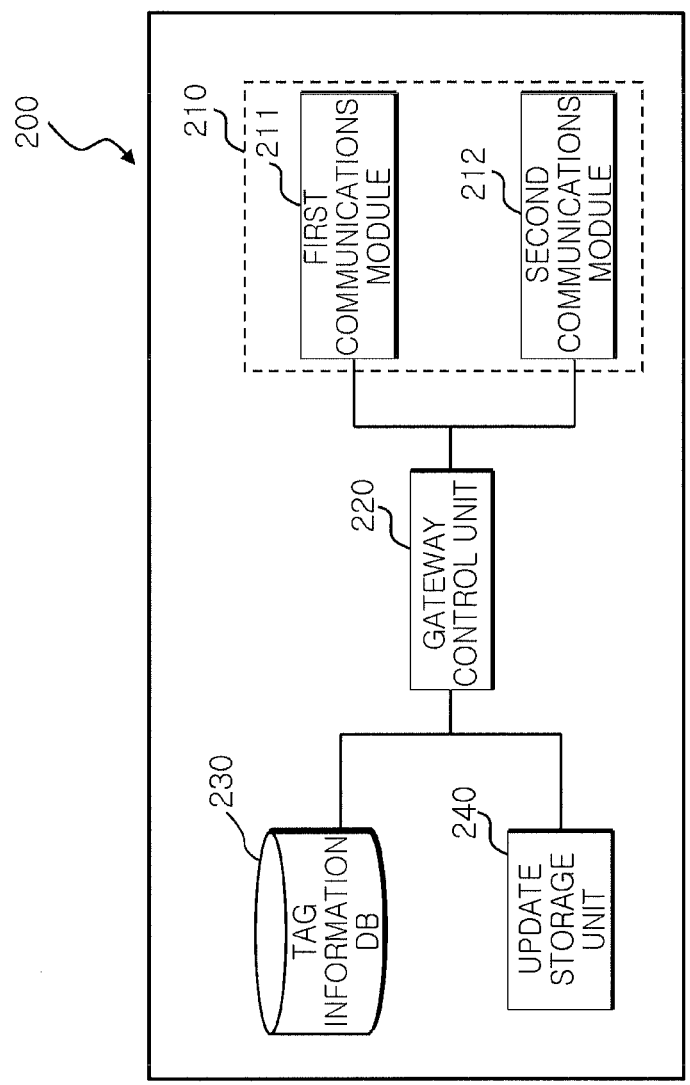
FIG. 3 is a configuration diagram for explaining a gateway according to the embodiment of the present invention.

FIG. 3 is a configuration diagram for explaining a gateway according to the embodiment of the present invention.

Referring to FIG. 3, each gateway 200 may include a communications unit 210, a gateway control unit 220, a tag information database 230, and an update storage unit 240.

The communications unit 210 may include a first communications module 211 and a second communications module 212. Here, the first communications module 211 may form a communications environment with the electronic shelf label server 100, and the second communications module 212 may form a communications environment with the electronic shelf label tag 300. Therefore, the second communications module 212 may perform wireless communications using both the wakeup channel and the data channel.

The gateway control unit 220 may control other components of the gateway 200.

In the embodiment of the present invention, the gateway control unit 220 may store the update data provided from the electronic shelf label server 100 in the update storage unit 240.

In the embodiment of the present invention, the gateway control unit 220 may periodically broadcast the wakeup message to the electronic shelf label tags 300 through the wakeup channel. Here, the broadcasting means that data is transmitted using a communications protocol in which a response of a transmission target does not wait. In the embodiment of the present invention, the gateway control unit 220 may broadcast the wakeup message according to a control of the electronic shelf label server 100.

In the embodiment of the present invention, the gateway control unit 220 may register the electronic shelf label tags 300. The gateway control unit 220 may provide the update data to the electronic shelf label tag 300 registered by the gateway 200.

The tag information database 230 may store information regarding at least one electronic shelf label tag 300 managed by the gateway 200. For example, the tag information database 230 may store address identification information on a tag, or the like.

The update storage unit 240 may store the update data provided from the electronic shelf label server 100.

Figure 4:
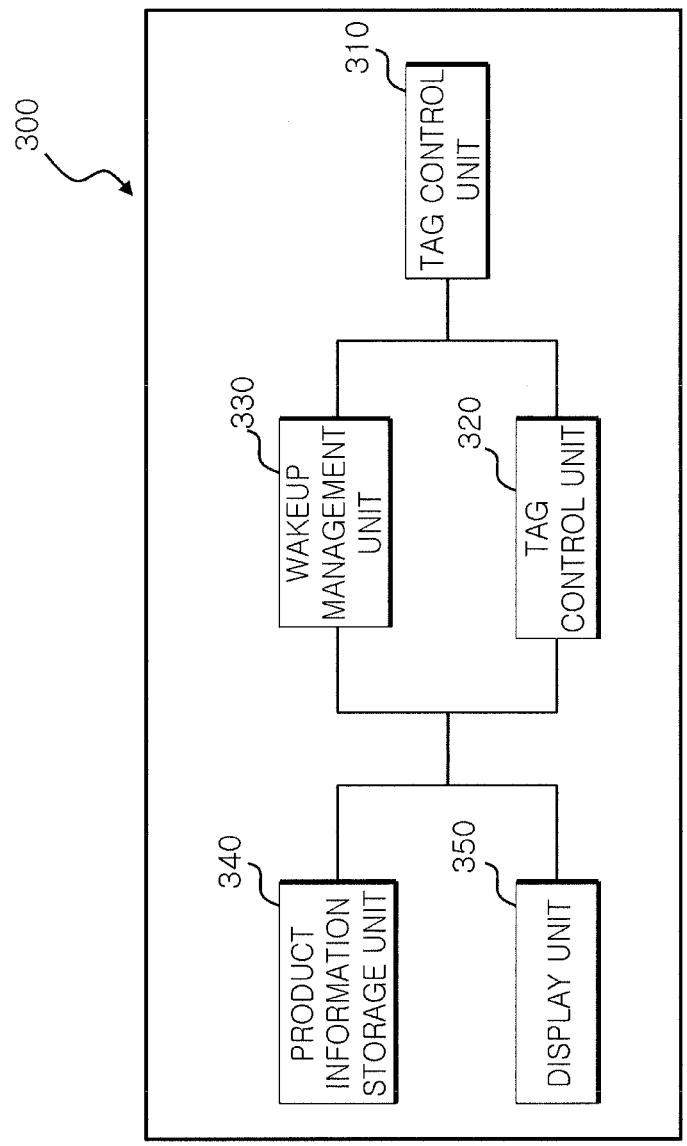
FIG. 4 is a configuration diagram for explaining an electronic shelf label tag according to the embodiment of the present invention.

FIG. 4 is a configuration diagram for explaining an electronic shelf label tag according to the embodiment of the present invention.

Referring to FIG. 4, each electronic shelf label tag 300 may include a communications unit 310, a tag control unit 320, a wakeup management unit 330, a product information storage unit 340, and a display unit 350.

The communications unit 310 may form a wireless communications environment with the gateway 200. The communications unit 310 may perform wireless communications using both of the wakeup channel and the data channel, similar to the communications unit 210 of the gateway.

The tag control unit 320 may control other components of the electronic shelf label tag 300 to drive the electronic shelf label tag 300.

In the embodiment of the present invention, the tag control unit 320 may perform a registration process of registering the electronic shelf label tag 300 in the gateway 200.

In the embodiment of the present invention, the tag control unit 320 may store the update data provided from the gateway 200 in the product information storage unit 340. For example, the tag control unit 320 may transmit an update data request for determining whether the update data is present to the gateway 200 associated with the electronic shelf label tag 300 when the electronic shelf label tag 300 is changed from a sleep state to a wakeup state. When the update data is transmitted in response to the request, the data may be stored in the product information storage unit 340.

In the embodiment of the present invention, the tag control unit 320 may control production information stored in the product information storage unit 340 to be displayed to the outside through the display unit 350.

The wakeup management unit 340 may control sleep and wakeup operations of the electronic shelf label tag 300.

In the embodiment of the present invention, the wakeup management unit 340 may calculate a sleep time of the electronic shelf label tag 300 using information regarding the time slot allocated to the gateway associated with the electronic shelf label tag 300. The wakeup management unit 340 may set the electronic shelf label tag 300 to be in the sleep state for the calculated sleep time and set the electronic shelf label tag 300 to be in the wakeup state when the sleep time has elapsed.

A specific operation of the wakeup management unit 340 will be described below in more detail with reference to FIGS. 5 through 6.

The product information storage unit 330 may store the update data provided from the gateway 200.

The display unit 350 may externally display content corresponding to the data stored in the product information storage unit 330. Since the display unit 350 may be implemented by various display means such as a light emitting diode (LED), a liquid crystal display (LCD), and the like, it is not limited to a specific means.

Figure 5:
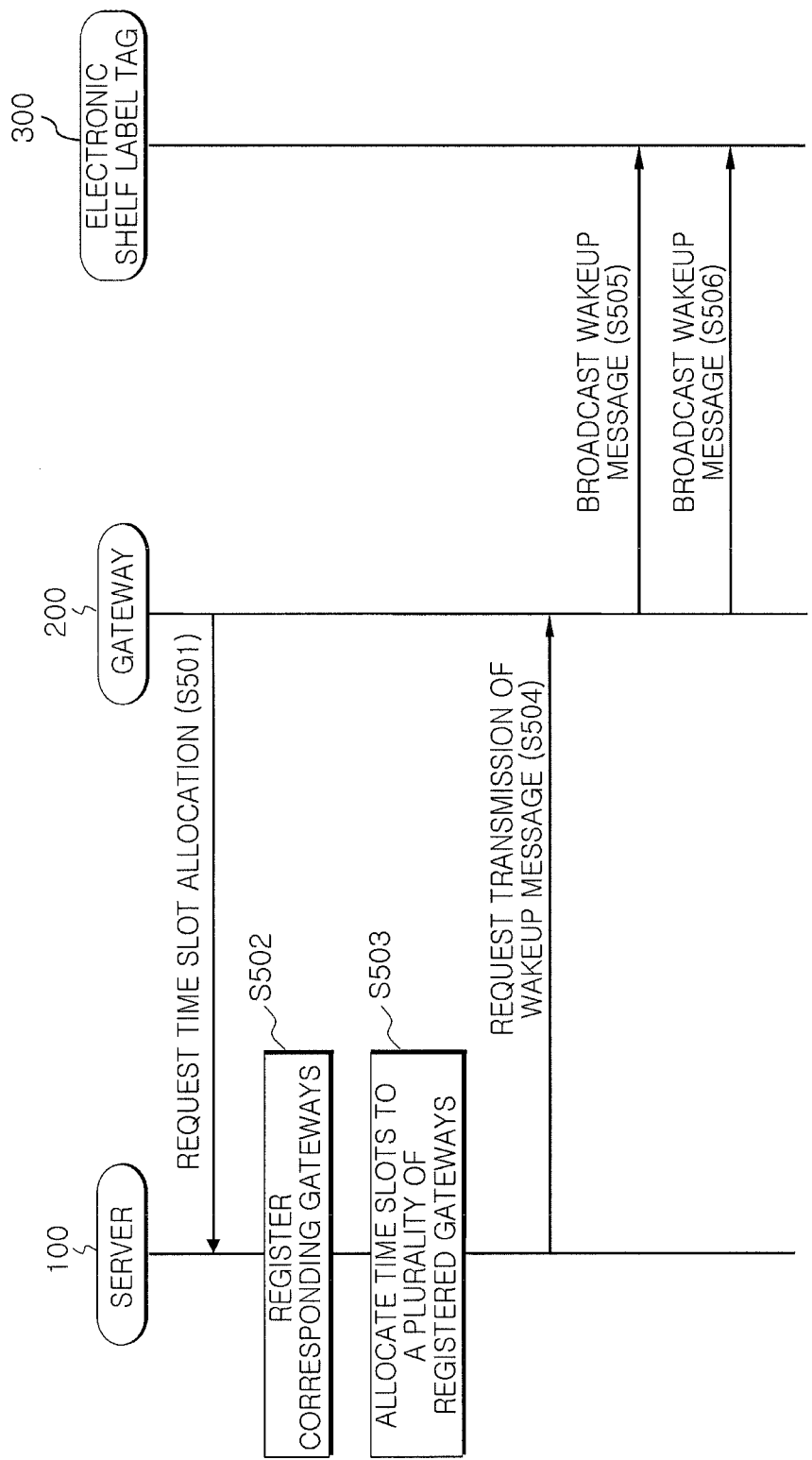
FIGS. 5 and 6 are flow charts for explaining a method of operating an electronic shelf label system according to an embodiment of the present invention.
Figure 6:
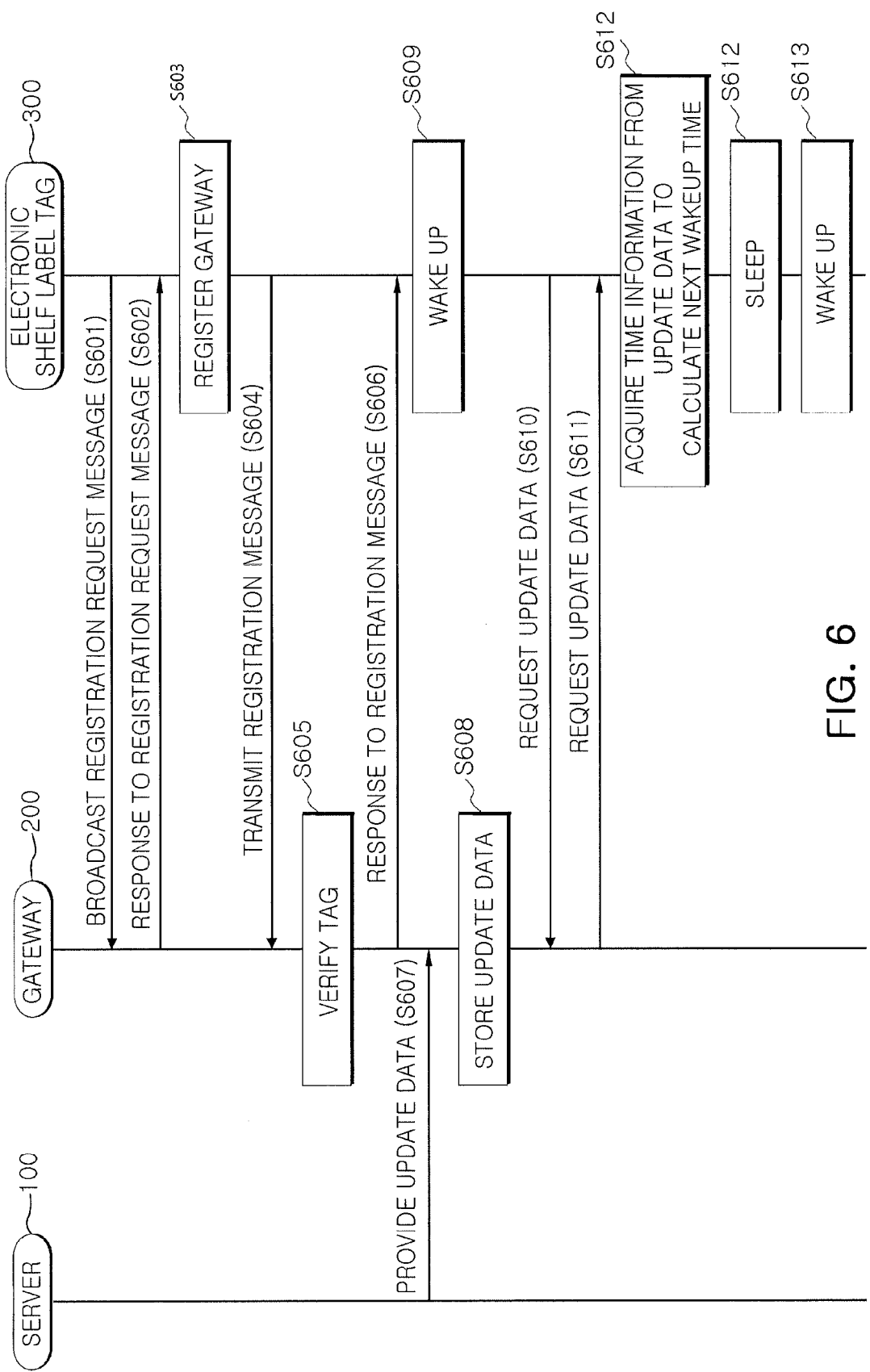
Figure 7:
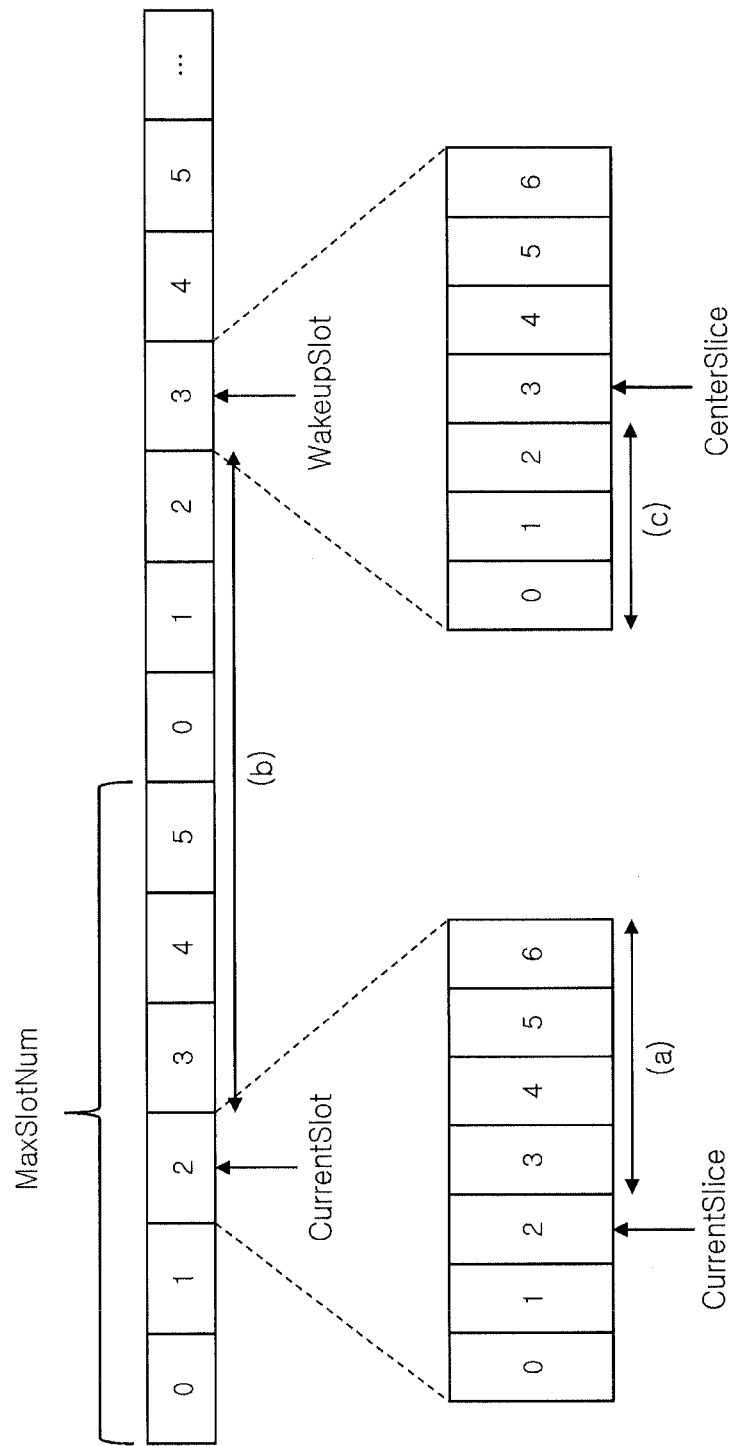
FIG. 7 is a reference diagram for explaining an example of calculating a sleep time in the electronic shelf label tag according to the embodiment of the present invention.

FIGS. 5 and 6 are flow charts for explaining a method of operating an electronic shelf label system according to an embodiment of the present invention; and FIG. 7 is a reference diagram for explaining an example of calculating a sleep time in the electronic shelf label tag according to the embodiment of the present invention.

Hereinafter, the method of operating an electronic shelf label system according to the embodiment of the present invention will be described in more detail with reference to FIGS. 5 through 7.

FIG. 5 is a flow chart for explaining a process of registering the gateway 200 and providing the wakeup message in the electronic shelf label system.

In FIG. 5, the gateways 200 may interlock with the electronic shelf label server 100 to thereby be allocated a time slot of the wakeup channel. That is, when the gateways 200 requests allocation of the time slot from the electronic shelf label server 100 (S501), the electronic shelf label sever 100 may register the corresponding gateways 200 (S502). The electronic shelf label server 100 may divide the time slot so as to correspond to the number of the registered gateways and allocate the divided time slots to the respective gateways (S503). The electronic shelf label server 100 may provide information regarding the allocated time slot to the gateways 200.

The gateways 200 may provide information regarding the time slot allocated thereto to the plurality of electronic shelf label tags managed by the gateways 200.

In the embodiment of the present invention, the gateways 200 may periodically broadcast the wakeup message through the wakeup channel using a frequency band different from that of the data channel and provide the information regarding the time slot allocated thereto using the wakeup message.

In the embodiment of the present invention, the electronic shelf label server 100 may control the gateway 200 to transmit the wakeup message. More specifically, the electronic shelf label server 100 may request transmission of the wakeup message from the gateway 200 (S504), and the gateway 200 may broadcast the wakeup message to the electronic shelf label tag 300 (S505 and S506) when it receives the request. The wakeup message may be periodically broadcast.

In the embodiment of the present invention, the wakeup message may include an electronic shelf label tag identifier. That is, the electronic shelf label tag 300 may be set to be in the wakeup state for oneself when the sleep time ends. Then, the electronic shelf label tag 300 may receive the wakeup message in the wakeup state, determine whether the electronic shelf label tag identifier is present in the received message, recalculate a sleep time when the identifier is not present and may be reset to be in a sleep mode.

In the embodiment of the present invention, the wakeup message may include information regarding the time slot allocated to the gateway 200 and information regarding the time slice. A description thereof will be provided below with reference to FIG. 7.

FIG. 6 is a flow chart for explaining a process of registering the electronic shelf label tag and a process of transmitting the update data in the electronic shelf label system.

The process of registering the electronic shelf label tag will be first described. The electronic shelf label tag 300 may broadcast a registration request message (S601). Here, since the broadcasting means that the data is transmitted without specifying the other party and waiting for a response of the other party as described above, the registration request message of the electronic shelf label tag 300 may be received by the plurality of gateways 200.

The plurality of gateways 200 receiving the registration request message may provide a response (a registration request message response) to the registration request message to the corresponding electronic shelf label tag 300 (S602). More specifically, when the gateway 200 receives a registration request message broadcast from a first electronic shelf label tag, it may transmit a response to the registration request message to the first electronic shelf label tag. Then, when the gateway 200 receives a registration message according to the response from the first electronic shelf label tag, the gateway 200 may determine whether the first electronic shelf label tag has been registered in the electronic shelf label server 100 and set the first electronic shelf label tag as a management tag of the gateway 200 and transmit a response to the registration message to the first electronic shelf label tag, when the first electronic shelf label tag has been registered in the electronic shelf label server 100.

When the electronic shelf label tag 300 receives a plurality of registration request messages from the plurality of gateways 200, it may select and register any one gateway having the best communications connection from among the plurality of gateways 200 (S603) and transmit a registration message to the selected gateway (S604).

When the gateway 200 receives the registration message, it may verify the corresponding electronic shelf label tag (S605) and transmit a response to the registration message (S606) when the corresponding electronic shelf label tag is an effectively verified tag, thereby ending a registration procedure.

Next, the process of transmitting the update data will be described. First, when the update data is generated in the electronic shelf label server 100, the electronic shelf label server 100 may provide the update data to the gateway 200 (S607). The gateway 200 may store the update data provided from the electronic shelf label server 100 (S608).

The electronic shelf label tag 300 may be set to be in the wakeup state for oneself (S609) when the sleep time has elapsed. Although not shown in FIG. 6, the electronic shelf label tag 300 may determine whether identification information of the electronic shelf label tag 300 is present in the wakeup message received in the wakeup state to thereby be maintained in the wakeup state.

Then, the electronic shelf label tag 300 may transmit an update data request to the gateway 200 in order to determine whether the update data is present (S610).

Meanwhile, when the gateway 200 receives the update data request from the electronic shelf label tag 300 (S610), it may provide the corresponding update data to the electronic shelf label tag 300. More specifically, the gateway 200 may receive the update date associated with the respective electronic shelf label tags from the electronic shelf label server 100. Then, the gateway 200 may identify the first electronic shelf label tag transmitting the update date request, select the update data associated with the first electronic shelf label tag, and provide the selected update date to the first electronic shelf label tag (S611).

The electronic shelf label tag 300 may receive the update date and acquire time information from the update date to calculate the following wakeup time (S612).

Next, the electronic shelf label tag 300 may be maintained in the sleep state for a calculated sleep time (S613) and be changed to the wakeup state for oneself when the sleep time ends (S614).

Figure 8:
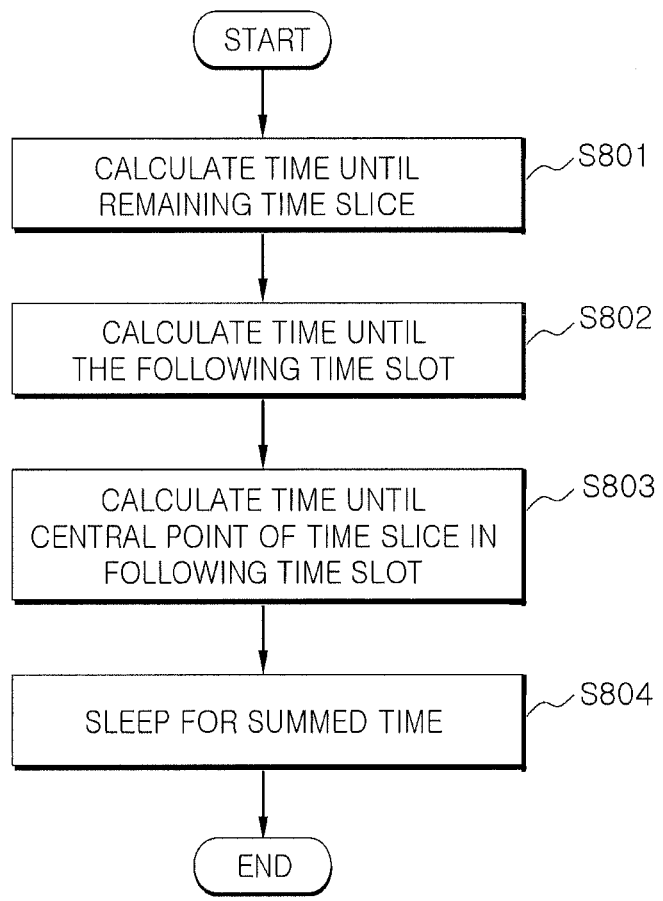
FIGS. 8 and 9 are flow charts for explaining examples of calculating a sleep time, performed by the electronic shelf label tag according to the embodiment of the present invention.
Figure 9:
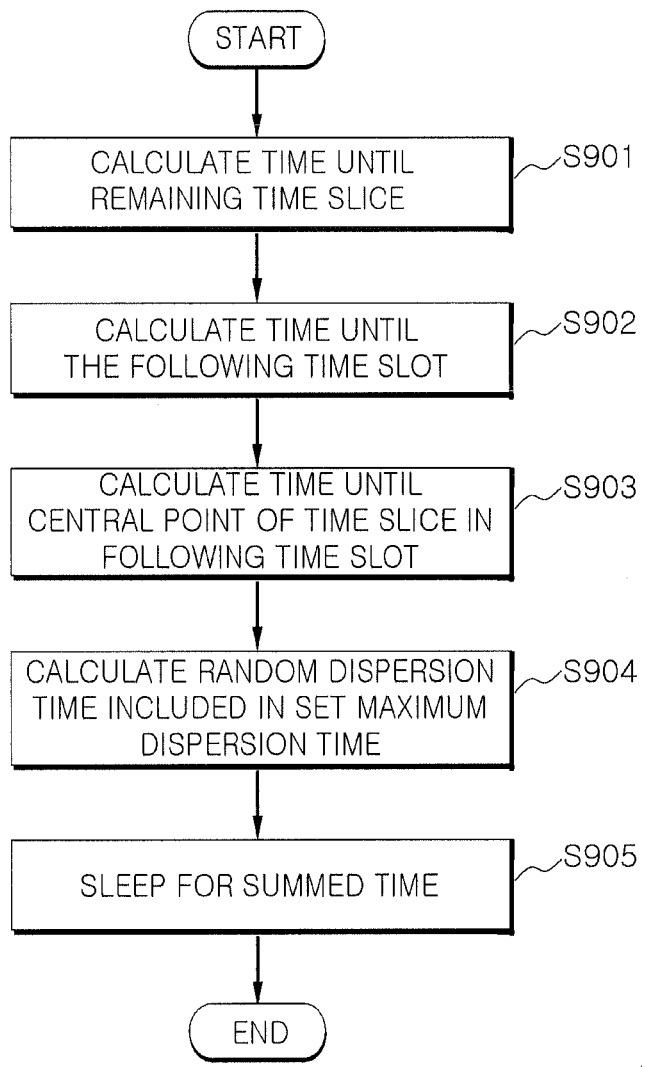

FIG. 7 is a reference diagram for explaining an example of calculating a sleep time in the electronic shelf label tag according to the embodiment of the present invention; and FIGS. 8 and 9 are flow charts for explaining examples of calculating a sleep time, performed by the electronic shelf label tag according to the embodiment of the present invention.

Hereinafter, the process of calculating a sleep time in the electronic shelf label tag 300 will be described in more detail with reference to FIGS. 7 through 9.

FIG. 7 shows a time slot and a time slice. As shown in FIG. 7, the wakeup channel may be divided into a plurality of (six in an example shown in FIG. 7) time slots, and a single time slot may be divided into a predetermined number of (seven in the example shown in FIG. 7) time slices. Here, the number of time slots may correspond to that of gateways of the electronic shelf label system, as described above.

The electronic shelf label tag 300 may receive information regarding these time slots through the wakeup message as described above or receive the information in the registration procedure.

In the example shown in FIG. 7, a current point in time is time slice 2 (CurrentSlice) of time slot 2 (CurrentSlot). Hereinafter, a method of calculating a sleep time until the following wakeup time will be described in more detail.

The electronic shelf label tag 300 may calculate a first time (a) from a current time slice to a final time slice (S801 or S901). The first time may be calculated by subtracting the number of current time slices from the total number of time slices and then multiplying a result obtained by the subtraction by a unit time.

Then, the electronic shelf label tag 300 may calculate a second time (b) from a current time slot (CurrentSlot) to the following time slot (WakeupSlot) of the gateway (S802 or S902). In FIG. 7, an example in which the current time slot is different from the time slot (WakeupSlot) of the gateway is shown. This may be generated at a point in time after the electronic shelf label tag 300 is first registered. Then, the electronic shelf label tag 300 may be set in the wakeup state only in a time slot allocated to the gateway in which it is registered, that is, time slot 3 in the example shown in FIG. 7.

The second time (b) from the current time slot (CurrentSlot) to the following time slot (WakeupSlot) may be calculated by multiplying the number of remaining time slots from the current time slot (CurrentSlot) to the following time slot (WakeupSlot) by unit times of the time slots.

Then, the electronic shelf label tag 300 may calculate a third time (c) from a first time slice to a reference time slice (S803 or S903). In the embodiment of the present invention, the reference time slice may be a central value (time slice 3 shown in FIG. 7) of the time slices included in the time slot. This is to collectively wake up the electronic shelf label tags 300 at the center of the time slots allocated to the corresponding gateway to wake up the electronic shelf label tags 300 in a corresponding wakeup slot even in the case that a time error due to the wakeup of the electronic shelf label tags 300 occurs.

The third time (c) may be calculated by multiplying the number of time slices from the first time slice to the reference time slice by the unit times of the time slices.

Then, the electronic shelf label tag 300 may sum up the above-mentioned first to third times (a) to (c) to determine the sleep time (S804).

In the exemplary embodiment of the present invention, the electronic shelf label tag 300 may calculate the sleep time in further consideration of a random dispersion time. In the case in which all of the electronic shelf label tags 300 are woken up in a single time slice to request the update data, a collision may occur between the requests. Therefore, the electronic shelf label tags 300 are induced to be collectively woken up based on the reference time slice and differently set dispersion values are applied to the electronic shelf label tags 300, respectively, to prevent the collision.

More specifically, the gateway 200 may provide information regarding a maximum dispersion time for the reference time slice to the electronic shelf label tag 300. Here, the maximum dispersion time may be the same in all electronic shelf label tags 300 managed by the corresponding gateway 200. Here, the maximum dispersion time may be smaller than a time obtained by summing up the time slices. This is to allow the maximum dispersion time to be outside of the time (that is, a range of the time slot of the corresponding gateway) obtained by summing up the time slices even though the dispersion time is applied.

When the electronic shelf label tags 300 receive the maximum dispersion time, respective electronic shelf label tags 300 may generate a random number to calculate a random dispersion time belonging in the maximum dispersion time (S904).

Then, the electronic shelf label tag 300 may add the calculated random dispersion time to the above-mentioned first to third times (a) to (c) to determine the sleep time (S905).

As set forth above, according to the embodiments of the present invention, the wakeup channel may be shared by the plurality of gateways in a time division scheme, and the respective update tags may request the update data within a period of time allocated to the gateway managing the respective update tags for the update data.

While the present invention has been shown and described in connection with the embodiments, it will be apparent to those skilled in the art that modifications and variations can be made without departing from the spirit and scope of the invention as defined by the appended claims.

What is claimed is:

1. A method of operating an electronic shelf label system performed by gateways connected to electronic shelf label tags and providing data from an electronic shelf label server to the electronic shelf label tags through a data channel, the method comprising:
   interlocking with the electronic shelf label server wherein the electronic shelf label server allocates time slots of a wakeup channel and a number of the time slots corresponds to a number of the gateways;
   providing information about the allocated time slots to the electronic shelf label tags;

receiving an update data request from one of the electronic shelf label tags through the data channel; and providing update data in response to the update data request.

2. The method of claim 1, wherein the time slots are provided in an amount corresponding to the number of the gateways sharing the wakeup channel and are divided into time slices, respectively.

3. The method of claim 2, wherein the providing of the information regarding the time slots comprises periodically broadcasting a wakeup message through the wakeup channel using a frequency band different from that of the data channel, and the wakeup message comprises the information about the time slots allocated to the gateways and information about the time slices.

4. The method of claim 1, further comprising:
receiving a registration request message broadcast from a first electronic shelf label tag among the electronic shelf label tags;
transmitting a response to the registration request message to the first electronic shelf label tag;
determining whether the first electronic shelf label tag has been registered in the electronic shelf label server upon a registration message being received according to the response from the first electronic shelf label tag;
setting the first electronic shelf label tag as a management tag of a gateway of the gateways communicating with the first electronic shelf label tag; and
transmitting a response to the registration message to the first electronic shelf label tag, upon the first electronic shelf label tag being registered in the electronic shelf label server.

5. The method of claim 2, wherein the information regarding the time slots includes a maximum dispersion time for a reference time slice included in the time slices, and the electronic shelf label tags transmit the update data request in further consideration of the maximum dispersion time in a reference time slice belonging in the following time slot.

6. A method of operating an electronic shelf label system performed by electronic shelf label tags matched with gateways in a relationship of 1:N and receiving update data from the gateways, the method comprising:
receiving information about time slots of a wakeup channel allocated to the gateway wherein a number of the time slots correspond to a number of the gateways;
calculating a remaining sleep time until the next wakeup time using the information about the time slots upon a wakeup message being received at the electronic shelf label tags from the gateways through the wakeup channel; and
setting the electronic shelf label tags to be in a wakeup state upon the sleep time elapsing and transmitting an update data request to the gateways.

7. The method of claim 6, wherein the electronic shelf label tags transmit the update data request through a data channel using a frequency different from that of the wakeup channel.

8. The method of claim 6, wherein the number of the time slots corresponding to the number of the gateways sharing the wakeup channel are divided into time slices, respectively.

9. The method of claim 8, wherein the calculating of the remaining sleep time comprises:
calculating a first time from a current time slice to a final time slice;
calculating a second time from a current time slot to the following time slot;
calculating a third time from a first time slice to a reference time slice; and setting the remaining sleep time by summing up the first to third times.

10. The method of claim 8, wherein the calculating of the remaining sleep time comprises:
receiving a maximum dispersion time from a gateway;
generating a random number to calculate a random dispersion time belonging in the maximum dispersion time; and
adding the random dispersion time to the reference time slice of the following time slot of the gateway to set the remaining sleep time.

11. The method of claim 6, further comprising:
broadcasting a registration request message to the gateways;
receiving a response to the registration request message from at least one of the gateways and selecting a gateway having optimal communications connection from among the gateways; and
transmitting a registration message to the selected gateway.

12. An electronic shelf label system, comprising:
an electronic shelf label server;
gateways; and
electronic shelf label tags associated with each of the gateways, wherein
the electronic shelf label server is configured to divide time slots of a wakeup channel to each of the gateways and provides update data to the gateways,
the gateways are configured to provide information regarding the time slots of the wakeup channel allocated thereto to the electronic shelf label tags associated therewith and provide the update data to at least one of the electronic shelf label tags, and
the electronic shelf label tags are configured to calculate corresponding sleep times using the information about the time slots, and are set to be in a wakeup state and transmit an update data request to the gateways associated therewith upon the sleep times ending.

13. The electronic shelf label system of claim 12, wherein the gateways broadcast a wakeup frame using a single wakeup channel, and the single wakeup channel is divided into time slots in a time division scheme to be used independently by the gateways.

14. The electronic shelf label system of claim 13, wherein each of the time slots is divided into time slices, and the electronic shelf label tags calculate corresponding sleep times using the time slots allocated to the gateways associated therewith and the time slices.

15. The electronic shelf label system of claim 13, wherein the electronic shelf label tags calculate the sleep times using a first time from a current time slice to a final time slice, a second time from a current time slot to the following time slot of the gateways, a third time from a first time slice to a reference time slice, or a random dispersion time belonging in a maximum dispersion time.

16. An electronic shelf label gateway of an electronic shelf label system, the gateway comprising:
a communications processor configured to communicate with an electronic shelf label server and electronic shelf label tags using a wakeup channel and a data channel, and interlock with the electronic shelf label server, wherein the electronic shelf label server allocates time slots of the wakeup channel, and the wakeup channel is divided into time slots in a time division scheme to be used independently by gateways of the electronic shelf label system and a number of the time slots correspond to a number of the gateways;

an update storage configured to store update data received from the electronic shelf label server; and a gateway controller configured to periodically broadcast a wakeup message to the electronic shelf label tags through the wakeup channel, receive an update data request from one of the electronic shelf label tags through the data channel, and provide the update data in response to the update data request.

17. The gateway of claim 16, wherein the communications unit processor provides information about the allocated time slots to the electronic shelf label tags.

18. The gateway of claim 16, wherein the wakeup channel is a single wakeup channel and the data channel is a single data channel.

19. The gateway of claim 16, wherein each of the time slots is divided into time slices and the information regarding the time slots includes a maximum dispersion time for a reference time slice included in the time slices.

20. The gateway of claim 19, wherein the gateway controller periodically broadcasts the wakeup message through the wakeup channel using a frequency band different from that of the data channel, and the wakeup message comprises the information about the time slots allocated to the gateways and information about the time slices.

* * * * *